United States Patent [19]
Shinohara et al.

[11] Patent Number: 5,698,844
[45] Date of Patent: Dec. 16, 1997

[54] SOLID-STATE IMAGE SENSING DEVICE AND METHOD OF CONTROLLING THE SOLID-STATE IMAGE SENSING DEVICE

[75] Inventors: Mahito Shinohara, Tokyo; Hidekazu Takahashi, Isehara, both of Japan

[73] Assignee: Canon Kabushiki Kaisha, Tokyo, Japan

[21] Appl. No.: 690,935

[22] Filed: Aug. 1, 1996

[30] Foreign Application Priority Data

Aug. 2, 1995 [JP] Japan .................. 7-197469
Jan. 19, 1996 [JP] Japan .................. 8-007326

[51] Int. Cl.[6] ........................... H01J 40/14
[52] U.S. Cl. .................. 250/214 R; 250/208.1; 348/300
[58] Field of Search ................. 250/214 R, 214.1, 250/208.1; 348/241, 294, 300

[56] References Cited

U.S. PATENT DOCUMENTS

| Re. 34,309 | 7/1993 | Tanaka et al. ............. 358/213.11 |
|---|---|---|
| 5,288,988 | 2/1994 | Hashimoto et al. ............ 250/208.1 |
| 5,311,319 | 5/1994 | Monoi ............................. 348/300 |
| 5,424,529 | 6/1995 | Hashimoto et al. ............ 250/208.1 |
| 5,488,415 | 1/1996 | Uno ................................. 348/294 |
| 5,587,738 | 12/1996 | Shinohara ..................... 348/302 |

OTHER PUBLICATIONS

"A 128 × CMOS Active Pixel Image Sensor for Highly Integrated Imaging Systems", Sunetra K. Mendis, Sabrina E. Kemeny and Eric R. Fossum, Center for Space Microelectronics Technology Jet Propulsion Laboratory, California Institute of Technology, 4800 Oak Grove Drive, Pasadena, CA 91109, IEDM, IEEE, pp. 583–586, Jan. 1993.

*Primary Examiner*—Que Le
*Attorney, Agent, or Firm*—Fitzpatrick,Cella, Harper & Scinto

[57] ABSTRACT

A solid-state image sensing device has an inverting-amplifier constructed with MOS transistors, which is provided with electrical power through a common output line, and inputs and outputs signals through the common output line. With this configuration, a supply line conventionally used exclusively for supplying electrical power does not pass through a pixel of a solid-state image sensing device, thereby reducing difficulty of manufacturing a fine pixel and making a large aperture area. The inverting-amplifier of this solid-state image sensing device is reset to the same voltage as that of the common output line, and an offset voltage is read out. Thereafter, the electric charge inputted into the inverting-amplifier from a photo-electric converter is inverted and amplified, and the resultant signal is read out. Finally, a difference between the inverted and amplified signal and the offset voltage is obtained and outputted as an image signal.

20 Claims, 10 Drawing Sheets

SOLID-STATE IMAGE SENSING DEVICE AND METHOD OF CONTROLLING THE SOLID-STATE IMAGE SENSING DEVICE

BACKGROUND OF THE INVENTION

The present invention relates to an inverting-amplification type solid-state image sensing device using MOS transistors.

A conventional solid-state image sensing device is used as a line sensor for an image scanner and an area sensor for an 8 mm video camera, for example. As an image processing device improves, a solid-state image sensing device having a sensor cell of higher precision and better sensitivity is demanded. Further, in order to read out electrical signals corresponding to the intensity of incoming light more accurately, it is necessary to remove noises from the signals as they are transmitted.

A conventional solid-state image sensing device is mainly configured with a photo-sensing surface constructed by using large numbers of photodiodes, a scanning circuit for scanning an image on the photo-sensing surface to obtain image signals, and a switch for connecting the photo-sensing surface and the scanning circuit. As for a solid-state image sensing device using photodiodes, there are two types, so called a MOS type and a CCD type. Here, a word "MOS" is an abbreviation for "Metal-Oxide-Semiconductor". The both types of solid-state image sensing devices actually use MOS transistors, and the former type is precisely a MOS FET type and the latter type is a MOS CCD type.

Photo-electrons stored in a MOS FET photodiode are read out to a scanning circuit by using MOS transistors, then outputted. Eric R. Fossum et al. suggested in 1993 *IEDM* P. 583 an example of a solid-state image sensing apparatus having a structure such that a photo-electric charge was stored in a gate of a MOS transistor and a signal corresponding to the charge was read out from the MOS transistor which is connected as a source follower.

According to Fossum et al., since an offset output read out after resetting each pixel can be subtracted from a signal carrying an image signal which is added to a reset gate, it is possible to obtain an image signal which contains neither fixed-pattern noise which represents unevenness in output from each pixel nor random noise that is a kTC noise generated during resetting of each pixel.

However, according to the aforesaid example, a single pixel is configured with a photodiode and four MOS transistors, and a power-supply line and a ground line pass through the pixel. Therefore, there are problems in which, upon manufacturing a high-density pixels, an aperture area must be extremely small to make the size of each pixel small, or it is even impossible to make a pixel of an extremely reduced size by manufacturing it in miniaturization processes. Further, since a gate of a MOS transistor which is connected as a source follower is reset to a voltage of a power supply, the High level of a pulse used for resetting a pixel has to have a higher voltage than that of the power supply. Consequently, a pulse having a large voltage difference between the High level and the Low level is necessary.

Furthermore, the ratio of a signal outputted from the source of the source follower to a signal inputted to its gate is not greater than 1 and when a signal stored in a capacitor for storing an offset output and a signal stored in a capacitor for storing a total signal of an image signal plus a reset voltage are transmitted to a differential amplifier where one signal is subtracted from the other, the voltages of the signals drop. Accordingly, there is a problem in which S/N ratio tends to drop because of noises on the output lines and the differential amplifier. Thus, a processing circuit for differentiating signals produces noise. Furthermore, if memory means for storing noise component signal and a signal including an image signal component are used, the memory means also produces noises.

SUMMARY OF THE INVENTION

The present invention has been made in consideration of the above situation, and has as its object to provide a solid-state image sensing device capable of outputting a final signal of large S/N ratio by outputting the signal from a pixel with an inverting amplifier.

According to the present invention, the foregoing object is attained by providing a solid-state image sensing device comprising: photo-electric conversion means for converting incoming light into electric signals; power supply means for supplying a reference level to a sense line; and inverting-amplification means for outputting a voltage as a first signal corresponding to the electric signals outputted from the photo-electric conversion means through the sense line.

With the above configuration, it is possible to output an image signal by effectively using electrical power supplied to the inverting-amplification means.

It is another object of the present invention to provide a solid-state image sensing device, having an inverting-amplification structure, capable of removing noise components and outputting an image signal in high S/N ratio and a method of controlling the solid-state image sensing device.

According to the present invention, the foregoing object is attained by providing a solid-state image sensing device comprising: photo-electric conversion means for converting incoming light into electric signals; power supply means for supplying electrical power through a sense line; inverting-amplification means for inverse-amplifying an input signal, adding a first noise which is specific to the inverting-amplification means, and outputting the added signal through the sense line; memory means for inverting polarity of an input signal, adding a second noise which is specific to the memory means, and outputting the added signal through the sense line; and operation means for operating an input signals from the inverting-amplification means and the memory means, adding a third noise which is specific to the operation means, and outputting the added signal through the sense line.

Further, the method of controlling the solid-state image sensing device of the present invention comprises: a first output step of outputting the first noise of the sensor cell unit to the transfer unit; a second output step of inverting the first noise outputted at the first output step and outputting a signal to the memory cell unit after adding the second noise to the inverted first noise; a photo-electric conversion step of photo-electric converting incoming light into electric charge; a third output step of inverting and amplifying the electric charge obtained at the photo-electric conversion step, adding the first noise, and outputting the resultant signal to the transfer unit; a fourth output step of inverting the signal outputted at the second output step, adding the third noise to the inverted signal, and outputting the resultant signal to the transfer unit; a fifth output step of inverting the signal outputted at the third output step, adding the signal outputted at the fourth output step to the signal outputted at the third output step and the second noise to the inverted signal, and outputting the resultant signal to the memory cell unit; and a sixth output step of inverting the signal outputted at the fifth output step, adding the third noise, and outputting the resultant signal.

In addition, the method of controlling the solid-state image sensing device of the present invention comprises: a first output step of outputting the first noise of the sensor cell to the transfer unit; a second output step of adding the second noise to the first noise outputted at the first output step and outputting the resultant signal to the sensor cell unit; a third output step of storing the signal outputted at the second step, inverting the signal, adding the first noise to the inverted signal, and outputting the resultant signal to the transfer unit; a fourth output step of inverting the signal outputted at the third output step, adding the second noise to the inverted signal, and outputting the resultant signal to the memory cell unit; a first photo-electric conversion step of photo-electric converting incoming light into electric charge in the sensor cell unit; a fifth output step of inverting and amplifying the electric charge obtained at the first photo-electric conversion step in the sensor cell unit, adding the stored signal outputted at the second output step and the first noise to the inverted and amplified signal, and outputting the resultant signal to the transfer unit; a sixth output step of adding the second noise to the signal outputted at the fifth output step, and outputting the resultant signal as an image signal; a second photo-electric conversion step of photo-electric converting incoming light into electric charge in the sensor cell unit; a seventh output step of inverting and amplifying the charge obtained at the second photo-electric conversion step in the sensor cell unit, adding the stored signal outputted at the second output step and the first noise to the inverted and amplified signal, and outputting the resultant signal to the transfer unit; an eighth output step of inverting the signal outputted at the fourth output step, adding the third noise to the inverted signal, and outputting the resultant signal to the transfer unit; a ninth output step of inverting the signal outputted at the seventh output step, adding the signal outputted at the eighth output step and the second noise to the inverted signal, and outputting the resultant signal to the memory cell unit; and a tenth output step of inverting the signal outputted at the ninth output step, adding the third noise to the inverted signal, and outputting the resultant signal as an image signal.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Preferred embodiments of the present invention will be described in detail in accordance with the accompanying drawings.

<First Embodiment>

Figure 1:
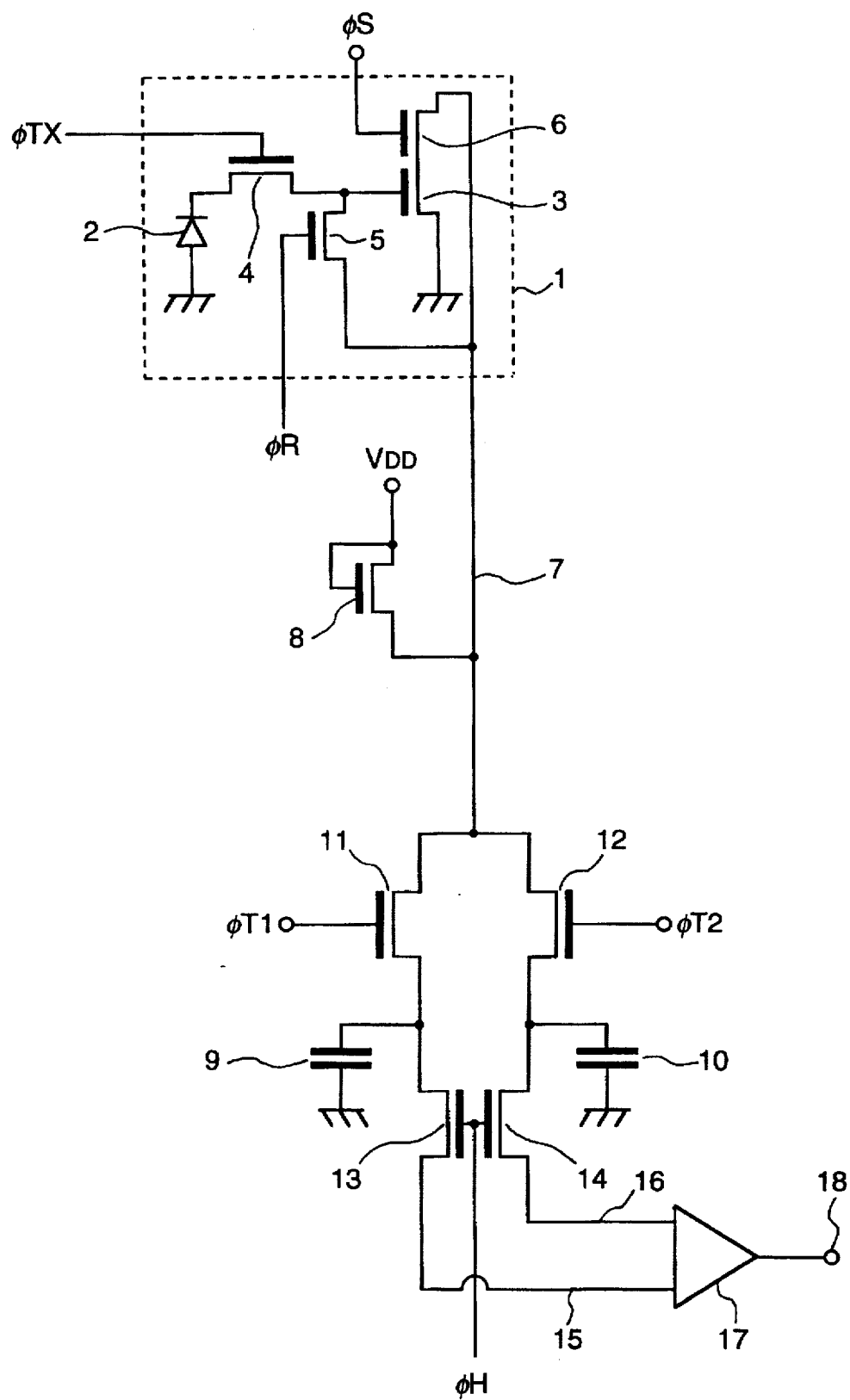
FIG. 1 is a circuit diagram of a solid-state image sensing device according to a first embodiment of the present invention.

FIG. 1 is an equivalent circuit diagram of a solid-state image sensing device of a first embodiment including a pixel and its peripherals. In FIG. 1, reference numeral 1 denotes a unit pixel; 2, a photodiode; 3, a MOS transistor which receives photo-electric charge from the photodiode 2 in the gate and outputs a signal from the drain; 4, a MOS transistor for transferring a signal charge from the photodiode 2 to the gate of the MOS transistor 3; 5, a MOS transistor used for resetting a voltage at the gate of the MOS transistor 3 to the voltage of an output line 7; and 6, a MOS transistor for selecting and scanning a pixel to be outputted. The aforesaid photodiode 2, the MOS transistors 3, 4, 5, and 6 configure the pixel 1.

Further, in FIG. 1, reference numeral 7 denotes a vertical output line (referred as "output line", hereinafter) and reference numeral 8 denotes a MOS transistor which forms an inverting amplifier together with the MOS transistor 3. The drain and gate of the MOS transistor 8 are connected to a power source $V_{DD}$, and the source is connected to the output line 7.

Further, reference numeral 9 denotes a capacitor which is charged to an offset voltage of a pixel; 10, a capacitor which is charged to a voltage of an image signal component (referred as "true image signal", hereinafter), which corresponds to an amplified photo-electric charge, plus an offset voltage (the total signal is referred as "image signal", hereinafter) from the pixel; 11, a MOS transistor for transferring the offset output; 12, a MOS transistor for transferring the image signal; 13 and 14, MOS transistors for transferring charges stored in the capacitors 9 and 10 to horizontal output lines 15 and 16, respectively; 17 a differential amplifier for subtracting the offset signal from the image signal; and 18, an output terminal of the differential amplifier 17. Further, $\phi TX$, $\phi R$, $\phi S$, $\phi T1$ and $\phi T2$ denote control pulses fed to the gates of the MOS transistors 4, 5, 6, 11 and 12, respectively, and $\phi H$ is a control pulse fed to the gates of the MOS transistors 13 and 14. $V_{DD}$ denotes a voltage of a power supply.

The circuit shown in FIG. 1 is a simplified circuit illustration of the solid-state image sensing device, and a plurality sets of the elements denoted by reference numerals 7, 8, 9, 10, 11, 12, 13, 14 are arranged in parallel, and a plurality of pixels such as the pixel 1 connect to each output line in parallel. In the aforesaid manner, several hundredthousands of pixels are arranged in both the vertical and horizontal directions.

Figure 3:
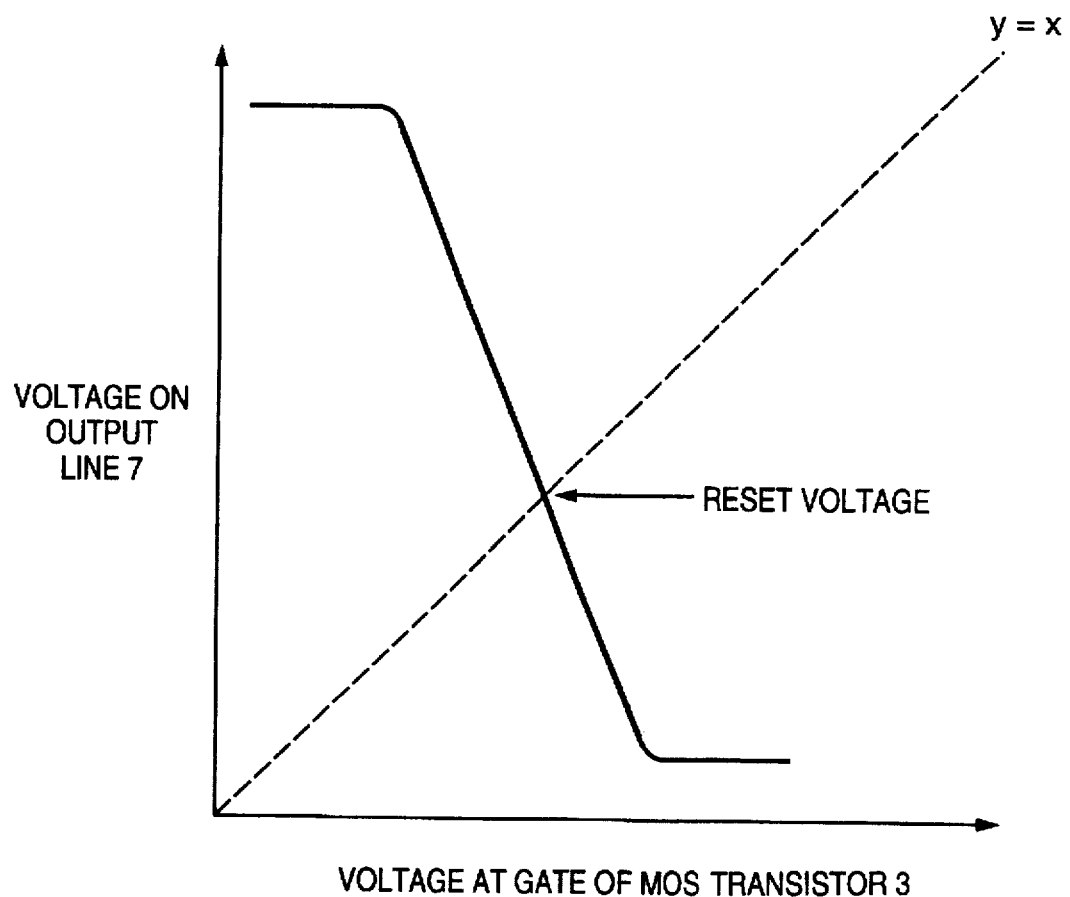
FIG. 3 is a graph showing input-output characteristic of an inverting amplifier for explaining a reset voltage of a pixel of the present invention.

FIG. 3 is a graph showing an input-output characteristic of the inverting amplifier configured with the MOS transistors 3 and 8. A voltage at the gate of the MOS transistor 3 is reset through the MOS transistor 5, and specifically, it is set at a voltage where an input voltage of the inverting amplifier equals to the output voltage of itself (reset voltage).

An operation of the solid-state image sensing device according to the first embodiment will be described below. The solid-state image sensing device shown in FIG. 1 is driven at the pulse timing shown in FIG. 2. First, the control pulse φS becomes High and a pixel from which a signal is to be outputted is selected. Then, the control pulse φR becomes High and the MOS transistor 5 turns ON, thereby the gate of the MOS transistor 3 is reset to the voltage of the output line 7. At the same time, the control pulse φT1 becomes High and the MOS transistor 11 turns ON. After the pulse φR becomes Low, the capacitor 9 is charged to an offset voltage corresponding to the reset voltage applied on the gate of the transistor 3 through the output line 7. Next, the control pulse φT1 becomes Low, thereby completing a reset process.

Thereafter, the control pulse φTX becomes High to turn the MOS transistor 4 ON, and photo-electric charge converted by the photodiode 2 is transferred to the gate of the MOS transistor 3. Since the control pulse φS is kept High, the voltage at the drain of the MOS transistor 3 changes depending upon the photo-electric charge applied to the gate. Since the MOS transistor 8 connected to the output line 7 and the power source $V_{DD}$ configures a pull-up power source, the MOS transistor 3 performs as if it amplifies the gate voltage (note, the proportional constant is negative in the range where the input voltage and the output voltage of the MOS transistor 3 has a proportional relationship) and outputs the amplified signal to the output line 7. As a result, a voltage representing the sum of the offset voltage and the amplified voltage of the photo-electric charge applied to the gate (i.e., an image signal) appears on the output line 7. At the same time, the control pulse φT2 becomes High to turn on the MOS transistor 12, thus the capacitor 10 is charged to the sum voltage.

Thereafter, the control pulse φS becomes Low, the MOS transistor 3 turns OFF. Then, the control pulse φH becomes High, the MOS transistors 13 and 14 turn ON, and the charge stored in the capacitor 9 in accordance with the offset voltage and the charge stored in the capacitor 10 in accordance with the image signal (sum voltage) are outputted to the horizontal output lines 15 and 16. Then, the difference between the voltages on the output lines 15 and 16 is taken and amplified, thus the offset voltage is canceled. Finally, a true image signal which is the amplified photo-electric charge is outputted from the output terminal 18.

In the first embodiment of the present invention, the rate of change in output voltage at the drain of the MOS transistor 3 from the reset voltage to the voltage obtained after the photo-electric charge is applied to the gate of the MOS transistor 3 is negative, and the polarity of the output signal is opposite to the polarity of the input signal, namely the output signal is negative, differing from an output from a conventional solid-state image sensing device. However, since the gain of the pixel can be greater than 1, it is possible to reduce the drop of the S/N ratio of the image signal output from the MOS transistor to noises originated by circuits, such as the differential amplifier. Furthermore, it is unnecessary to set the High level of the driving pulses to higher than the voltage of the power supply. Therefore, it is possible to realize a solid-state image sensing device of low-voltage driving type by configuring with the MOS transistors having low-voltage driving structures.

Further, since the $V_{DD}$ power supply line does not run through a pixel, which is different from a conventional solid-state image sensing device, difficulty in designing fine pixels is reduced. Since it is possible to widen an aperture area comparing to the conventional solid-state image sensing device, it is also possible to increase the S/N ratio with the wider aperture area, thereby obtaining an image signal of high quality.

<Second Embodiment>

Figure 4:
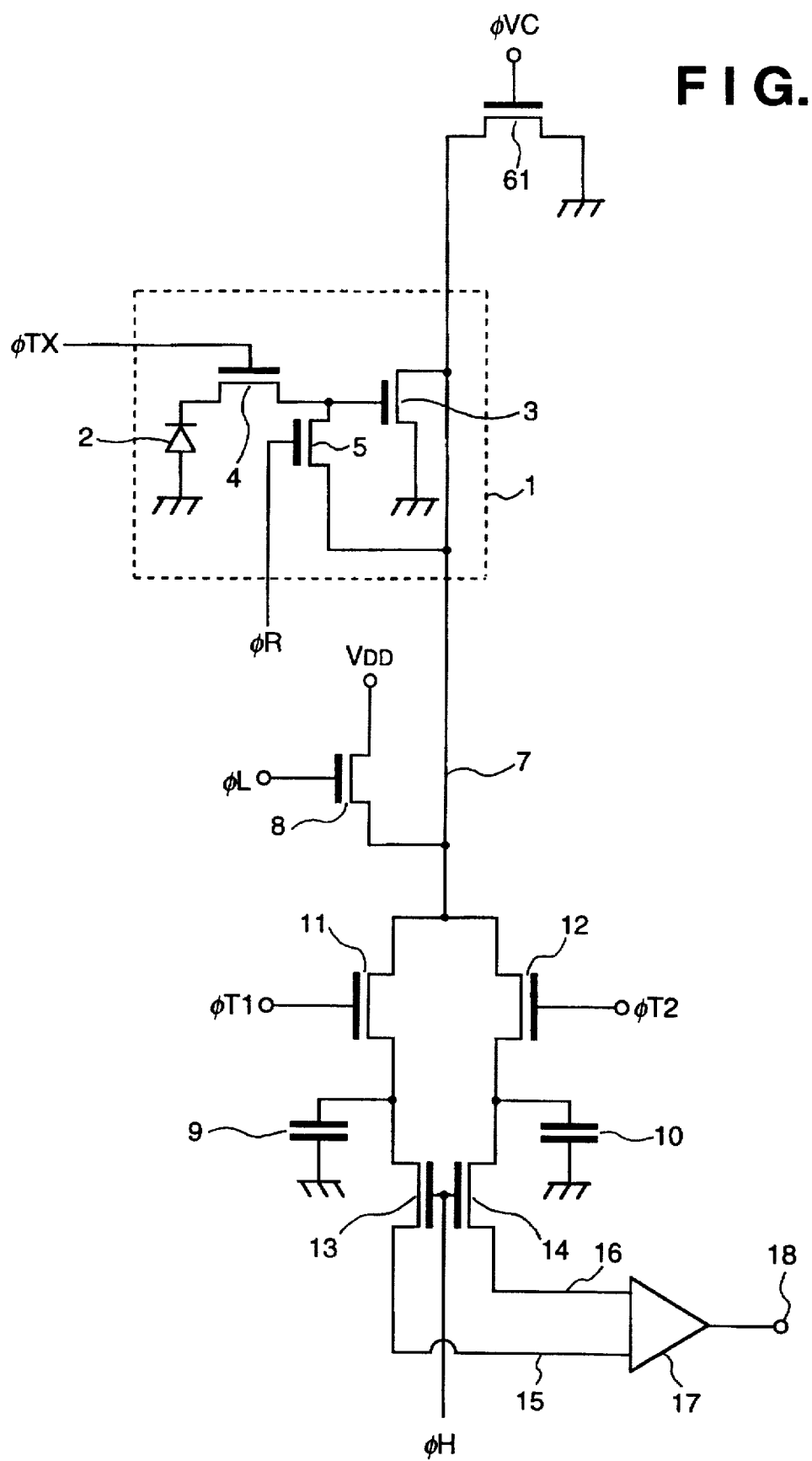
FIG. 4 is a circuit diagram of a solid-state image sensing device according to a second embodiment of the present invention.

FIG. 4 is an equivalent circuit diagram of a solid-state image sensing device of a second embodiment including a pixel and its peripherals. In FIG. 4, the same units and elements as those in FIG. 1 are referred by the same reference numerals and the explanations of those are omitted. Referring to FIG. 4, reference numeral 61 denotes a MOS transistor as a switch for grounding the output line 7, and the switch is controlled by the control pulse φVC applied to the gate of the MOS transistor 61. The gate of the MOS transistor 8 is controlled by the control pulse φL in the second embodiment. In the second embodiment, a MOS transistor exclusively used for selecting a pixel from which a signal is to be read out is not provided, and the drain of the MOS transistor 3 which configures a part of the inverting amplifier is directly connected to the output line 7. Therefore, the MOS transistor 3 has to be OFF when a signal is not read out from the pixel.

An operation of the solid-state image sensing device having the aforesaid configuration will be explained below.

First, the control pulse φL becomes Low to turn OFF the MOS transistor 8, and the control pulse φVC becomes High to turn ON the MOS transistor 61, thereby grounding the output line 7. Under this condition, the MOS transistor 5 for reset operation is turned ON by the High pulse of the control pulse φR, thereby grounding the gate of the MOS transistor 3 and resetting it. The MOS transistor 3 has to be completely turned OFF when the voltage on the gate of the MOS transistor 3 of pixel from which a signal is not read out, i.e., a non-selected pixel, is 0V (GND). For this reason, the MOS transistor 3 is an enhancement type so that it becomes non-conductive when voltages at the gate and the source are 0V. Therefore, no signal is outputted from non-selected pixels.

Figure 2:
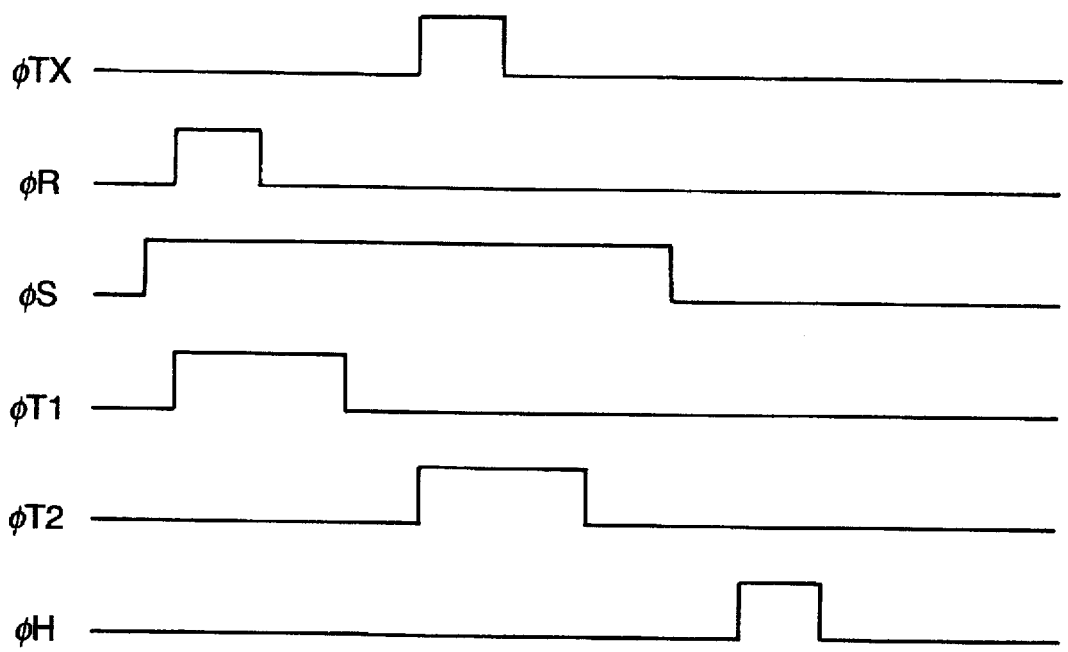
FIG. 2 is a timing chart for explaining a method of controlling the solid-state image sensing device of the present invention.

Next, under the situation where the control pulse φVC becomes Low and the control pulse φL is High, selection of the pixel from which a signal is read out and an operation for reading the signal are performed according to the timing shown in FIG. 2. When the control pulse φVC becomes Low, the control pulse φL becomes High, and the control pulse φR becomes High, the enhancement type MOS transistor 3 turns ON. At the same time the control pulse φT1 becomes High. Thereafter, when the control pulse φR becomes Low, the capacitor 9 is charged to an offset voltage which is amplified by the MOS transistor 3. Next, the control pulse φT1 becomes Low and the control pulse φTX becomes High to turn ON the MOS transistor 4, further the control pulse φT2 also becomes High, thereby the capacitor 10 is charged to the voltage on the output line 7 (image signal). The charge stored in the capacitor 10 corresponds to the sum of an amplified voltage corresponding to photo-electric charge (amplification coefficient is negative) and the offset voltage.

After the control pulse φTX and the control pulse φT2 become Low, the control pulse φH becomes High and outputs the charges stored in the capacitors 9 and 10 to the horizontal output lines 15 and 16, respectively. Thereafter, the differential amplifier 17 takes the difference between the voltages on the horizontal output lines 15 and 16, and amplifies the difference. Thereby, the offset voltage is canceled, and a true image signal which corresponds to only the photo-electric charge is outputted from the output terminal 18.

According to the second embodiment as described above, the power supply line on each pixel is unnecessary. Further, the number of MOS transistors used in a pixel are three, i.e., the MOS transistors for configuring a part of an inverting amplifier, for transferring a photo-electric charge, and for resetting. Therefore, it is advantegeous in manufacturing fine pixels and the sizes of the apertures of the pixels compared to a conventional solid-state image sensing device.

In the first and second embodiment as described above, an operation of a pixel which outputs photo-electric charge from a photodiode is explained. However, a plurality of pixels are arranged in line, in practice, when configuring a line sensor, and each vertical output line of each pixel is scanned sequentially to obtain image signal of a single line. Further, when configuring an area sensor, a plurality of pixels are arranged both vertically and horizontally, and each horizontal line and each vertical line are scanned sequentially to obtain image signals of a two dimensional image.

According to the first and second embodiments of the present invention as described above, an output from a pixel is obtained from the drain of a MOS transistor which configures a part of an inverting amplifier capable of outputting a signal which is inputted to the drain of the MOS transistor. Accordingly, it is possible to obtain the output in higher voltage level comparing to the conventional image sensing device, therefore it is effective to prevent drop of the S/N ratio. Furthermore, since a power supply line does not pass through a pixel as well as the number of MOS transistors used in a pixel is reduced, it becomes easier to manufacture a solid-state image sensing device with finer pixels with wide aperture. As a result, the S/N ratio increases.

<Third Embodiment>

In the third embodiment, a solid-state image sensing device having an inverting amplifier, such as the one explained in the first and second embodiment, and a method of controlling the solid-state image sensing device capable of removing noises, such as noise from a differential amplifier, and outputting a true image signal, corresponding to a photo-electric charge, containing less noises is described.

Figure 5:
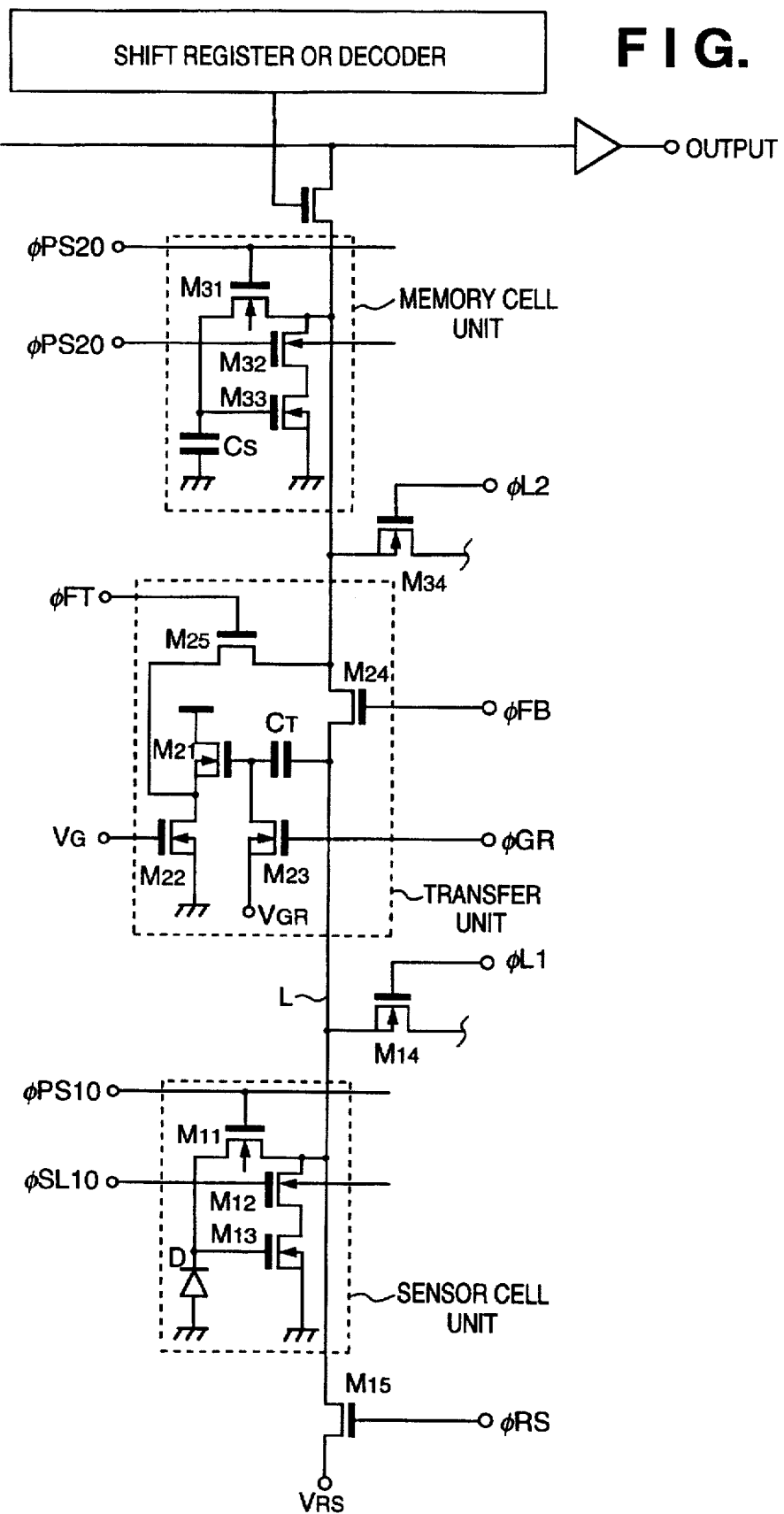
FIG. 5 is a circuit diagram of a solid-state image sensing device according to a third embodiment of the present invention.
Figure 6:
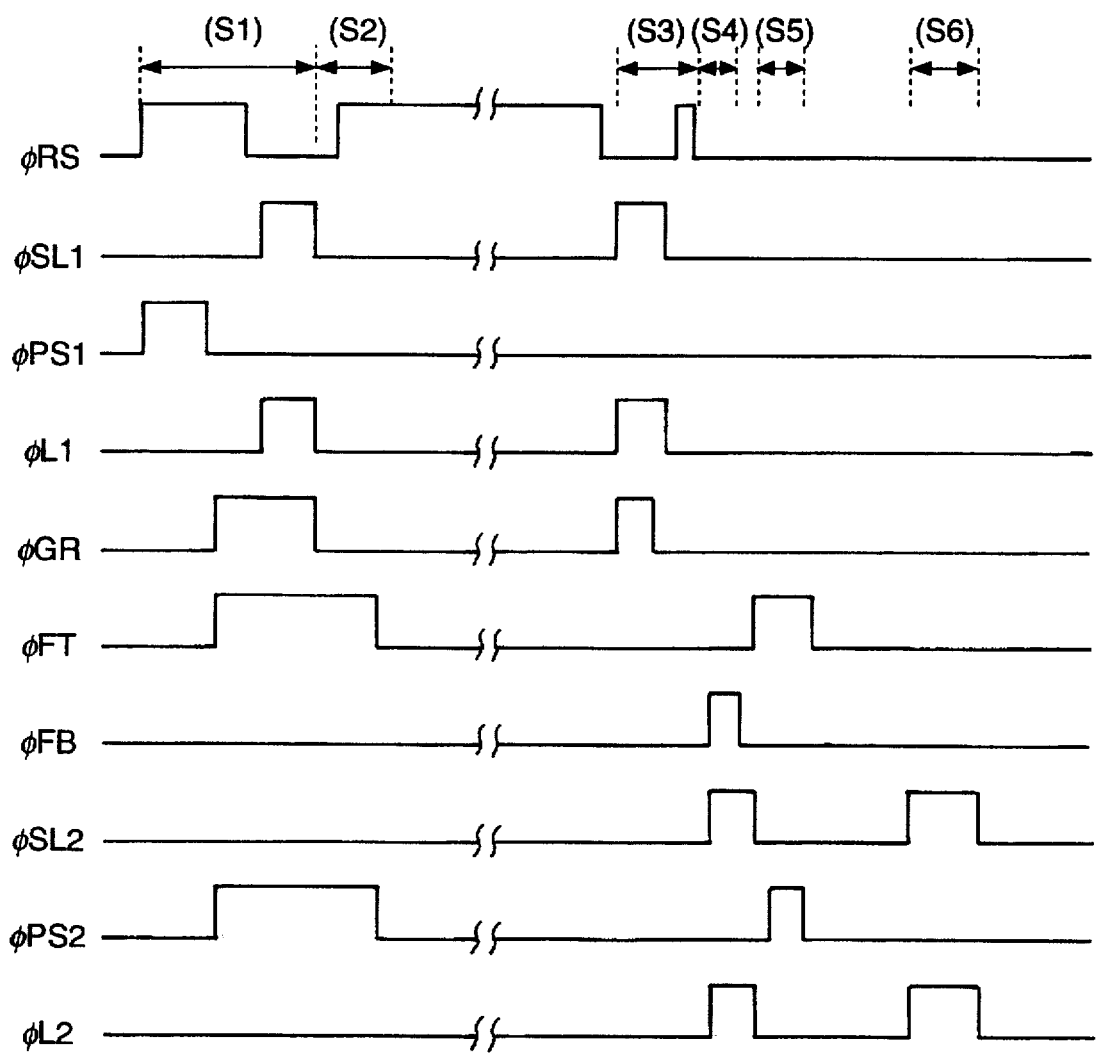
FIG. 6 is a timing chart for showing an operation of the solid-state image sensing device according to the third embodiment.

FIG. 5 is an equivalent circuit diagram of a solid-state image sensing device according to the third embodiment, and FIG. 6 is a timing chart showing timing for operating the solid-state image sensing device. Note, FIG. 5 shows an example having a sensor cell unit, a transfer unit and a memory cell unit, however, a plurality of each of these units can be provided. Further, only one common output line is shown in FIG. 5 for the sake of simplicity.

Referring to FIG. 5, a sensor cell unit includes a photodiode D and n channel MOS transistors $M_{11}$ to $M_{13}$, and outputs an inverted signal (gain is −1). An n channel MOS transistor $M_{14}$ for applying a predetermined voltage to the sensor cell unit and an n channel MOS transistor $M_{15}$ for applying a reset voltage $V_{RS}$ are connected to the common output line L. The MOS transistors $M_{11}$, $M_{12}$, $M_{14}$, $M_{15}$ turn ON and OFF in accordance with control pulses φPS1, φSL1, φL1 and φRS, respectively.

In the sensor cell unit, the MOS transistor $M_{11}$ and the MOS transistor $M_{15}$ are turned ON, first, and charges remained in the photodiode D and the gate of the MOS transistor $M_{13}$ are reset. Next, the MOS transistor $M_{11}$ and the MOS transistor $M_{15}$ are turned OFF, and the MOS transistor $M_{12}$ and the MOS transistor $M_{14}$ are turned ON, and noise (offset voltage) is read out. Then, photo-electric charge is stored in the photodiode D and the gate of the MOS transistor $M_{13}$, thereafter, a current corresponding to the charge stored in the gate of the MOS transistor $M_{13}$ flows and an image signal is read out.

The transfer unit has n channel MOS transistor 24 which controls to conduct to the common output line L or not, a capacitor $C_T$ connected to the common output line L (a terminal of the capacitor $C_T$ connected to the common output line L is called "terminal A", hereinafter), a p channel MOS transistor $M_{23}$ connected to the terminal of the capacitor $C_T$ other than the terminal A (this terminal is called "terminal B", hereinafter), n channel MOS transistors $M_{21}$ and $M_{22}$ as an amplifier (a MOS type source follower in the third embodiment) for outputting a signal in response to the voltage at the terminal B of the capacitor $C_T$, and n channel transistor $M_{25}$ for controlling signal transfer to the memory cell unit. A fixed voltage $V_G$ is applied to the n channel MOS transistor $M_{22}$, and the MOS transistors $M_{23}$, $M_{24}$ and $M_{25}$ are turned ON and OFF in response to control pulses φGR, φFB and φFT, respectively. In the transfer unit, voltages at terminals A and B of the capacitor $C_T$ are controlled to perform operations, such as inverting operation and addition, on an input signal.

The configuration of the memory cell unit is the same as that of the sensor cell unit except the photodiode D in the sensor cell unit which is replaced with a capacitor $C_S$ in the memory cell. More specifically, the memory cell unit has the capacitor $C_S$, n channel MOS transistors $M_{31}$, $M_{32}$ and $M_{33}$, and outputs an inverted signal (gain is −1). Further, an n channel MOS transistor $M_{34}$ is provided in the common output line L for applying a predetermined voltage to the memory cell unit. The MOS transistors $M_{31}$, $M_{32}$ and $M_{34}$ turn ON and OFF in response to control pulses φPS2, φSL2 and φL2, respectively. The memory cell unit reads a stored signal and is reset in the same manner as the sensor cell unit operates. An image signal read from the memory cell unit is selected by a shift register or a decoder, and outputted to an output line.

Figure 7:
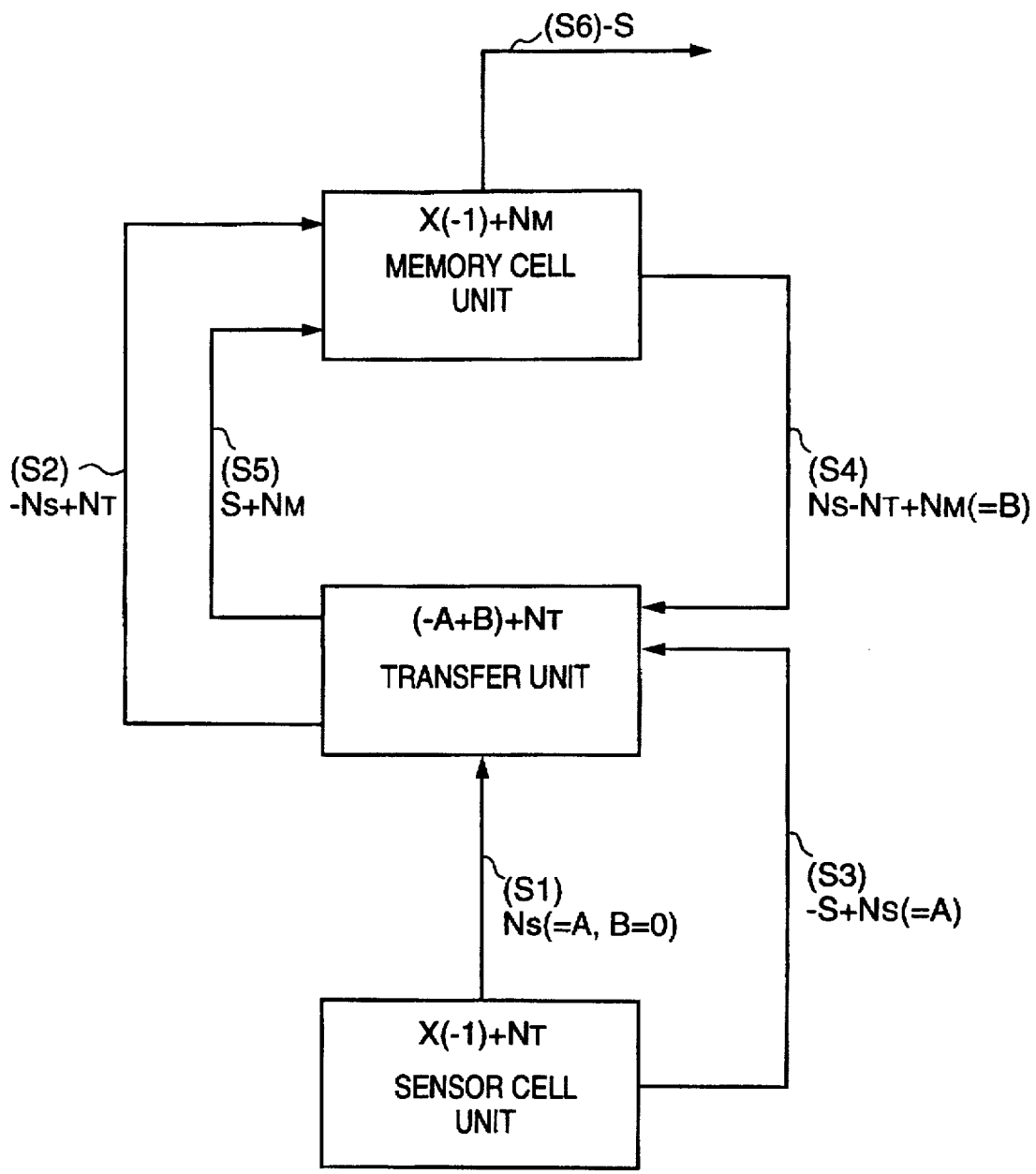
FIG. 7 is an explanatory view showing a flow of signals according to the third embodiment of the present invention.

Flow of a signal upon operating the aforesaid solid-state image sensing device will be briefly described with reference to FIG. 7. Note, periods referred by (S1) to (S6) in the timing chart of FIG. 6 correspond to the following operations referred by (S1) to (S6).

(S1) Noise $N_S$ of the sensor cell unit (referred as "sensor cell noise", hereinafter) is read out just after resetting the sensor cell, and transferred to the transfer unit.

(S2) The sensor cell noise $N_S$ is inverted in the transfer unit, then noise $N_T$ of the transfer unit (referred as "transfer noise", hereinafter) is added and the total noise, $(-N_S+N_T)$, and inputted to the memory cell unit.

(S3) After storing photo-electric converted charge, an inverted signal (sensor signal), −S, outputted in correspondence with the stored charge is added to the sensor cell noise $N_S$, then a signal $(-S+N_S)$ is outputted to the transfer unit. In the transfer unit, the input signal is inverted to $(S-N_S)$ and stored.

(S4) The noise $(-N_S+N_T)$ inputted to the memory cell unit is inverted to $(N_S-N_T)$, and noise of the memory cell unit (referred as "memory cell noise", hereinafter) is added, then the total noise $(N_S-N_T+N_M)$ is outputted to the transfer unit. In the transfer unit, the noise $(N_S-N_T+N_M)$ is added to the signal $(S-N_S)$, thus the total signal becomes $(S-N_T+N_M)$.

(S5) The transfer noise $N_T$ is added to the signal $(S-N_T+N_M)$, then the resultant signal $(S+N_M)$ is inputted to the memory cell.

(S6) The memory cell noise $N_M$ is added to the inverse of the input signal $(S+N_M)$, namely, $(-S-N_M)$. As a result, the sensor signal $-S$ is outputted.

Next, the above operations (S1) to (S6) are explained in more detail with reference to FIGS. 5 and 6.

First, the control pulses $\phi RS$ and $\phi PS1$ become High to reset the sensor cell unit.

Next, after the control pulses $\phi PS1$ becomes Low, the control pulses $\phi GR$, $\phi FT$ and $\phi PS2$ become High. At this time, the voltage at the terminal A of the capacitor $C_T$ is set to $V_{RS}$, and the voltage at the terminal B of the capacitor $C_T$ is set to $V_{GR}$. Then, after the control pulse $\phi RS$ becomes Low, the control pulses $\phi SL1$ and $\phi L1$ become High, thus the sensor cell noise $N_S$ after the reset operation is outputted from the sensor cell unit to the common output line L (The sensor cell noise is read out as $N_S$, thereby the voltage of the common output line L becomes $V_{RS}+N_S$, in this case). Thereafter, the control pulse $\phi GR$ becomes Low, to make the terminal B of the capacitor $C_T$ floating. Then, the control pulse $\phi RS$ becomes High, and the voltage of the common output line L changes to $V_{RS}$. Since the change of voltage at the terminal A of the capacitor $C_T$ is $-N_S$, the voltage at the terminal B of the capacitor $C_T$ also changes from the $V_{GR}$ by $-N_S$. As a result, an inverted sensor cell noise $-N_S$ is transferred to the memory cell unit. However, since the transfer noise $N_T$ is added to the inverted sensor cell noise $-N_S$, the total noise $(-N_S+N_T)$ is inputted to the memory cell unit as a result. The above operation corresponds to (S1) and (S2).

After photo-electric charge is stored in the sensor cell unit (the common output line L is reset to the voltage $V_{RS}$ at this time), the control pulse $\phi GR$ becomes High, and the voltage at the terminal B of the capacitor $C_T$ becomes $V_{GR}$. When the control pulses $\phi SL1$ and $\phi L1$ become High, a signal $(-S+N_S)$, which is the sensor signal $-S$ added with a sensor cell noise $N_S$, is read out from the sensor cell unit. Thereby, the voltage of the common output line changes from the $V_{RS}$ to $V_{RS}+(-S+N_S)$. Further, the control pulse $\phi GR$ becomes Low to make the terminal B of the capacitor $C_T$ floating.

Next, the control pulse $\phi RS$ becomes High. The voltage at the terminal A of the capacitor $C_T$ of the transfer unit becomes $V_{RS}$ accordingly, and is changed by $-(-S+N_S)$. As a result, the voltage at the terminal B changes by the same amount $-(-S+N_S)$, thus the voltage becomes $V_{GR}-(-S+N_S)$. Thereafter, the control pulse $\phi RS$ becomes Low. The above operation corresponds to (S3).

Next, the control pulses $\phi FB$, $\phi SL2$ and $\phi L2$ become High, and the noise $(-N_S+N_T)$ stored in the memory cell unit is inverted to the signal $(N_S-N_T)$, then the memory cell noise $N_M$ is added to it, and the total noise $(N_S-N_T+N_M)$ is outputted from the memory cell unit to the terminal A of the capacitor $C_T$ of the transfer unit. Upon transferring the signal $(N_S-N_T+N_M)$, the voltage at the terminal A of the capacitor $C_T$ of the transfer unit changes by $(N_S-N_T+N_M)$, thereby the voltage at the terminal B of the capacitor $C_T$ also changes by the same amount. As a result, the voltage at the terminal B of the capacitor $C_T$ becomes $V_{GR}-(-S+N_S)+(N_S-N_T+N_M)=V_{GR}+S-N_T+N_M$. This is the aforesaid operation (S4).

Next, the control pulses $\phi FT$ and $\phi PS2$ become High, and the signal $(S-N_T+N_M)$ is transmitted from the transfer unit to the memory cell unit. Upon transferring the signal $(S-N_T+N_M)$, since the transfer noise $N_T$ is added to the signal, a signal $(S+N_M)$ is inputted to the memory cell unit. This is the operation (S5).

Thereafter, the control pulses $\phi SL2$ and $\phi L2$ become High, and the inverse of the input signal $(S+N_M)$ is read out from the memory cell unit. Upon reading the signal, the memory cell noise $N_M$ is added to the inverted signal $(-S-N_M)$ of the input signal $(S+N_M)$. Consequently, the sensor signal $-S$ without noise components is outputted. This is the operation (S6).

According to the third embodiment as described above, not only fixed pattern noises of a sensor but also random noises which changes in each reset operation of the sensor can be removed, thereby outputting a signal in high S/N ratio.

<Fourth Embodiment>

In the fourth embodiment, a solid-state image sensing device having an inverting amplifier, such as the one explained in the third embodiment, and method capable of removing noise components from an image signal outputted from memory cells and a signal outputted from sensor cells during a charge sotrage period, which is used for controlling the charge storage period.

Figure 8:
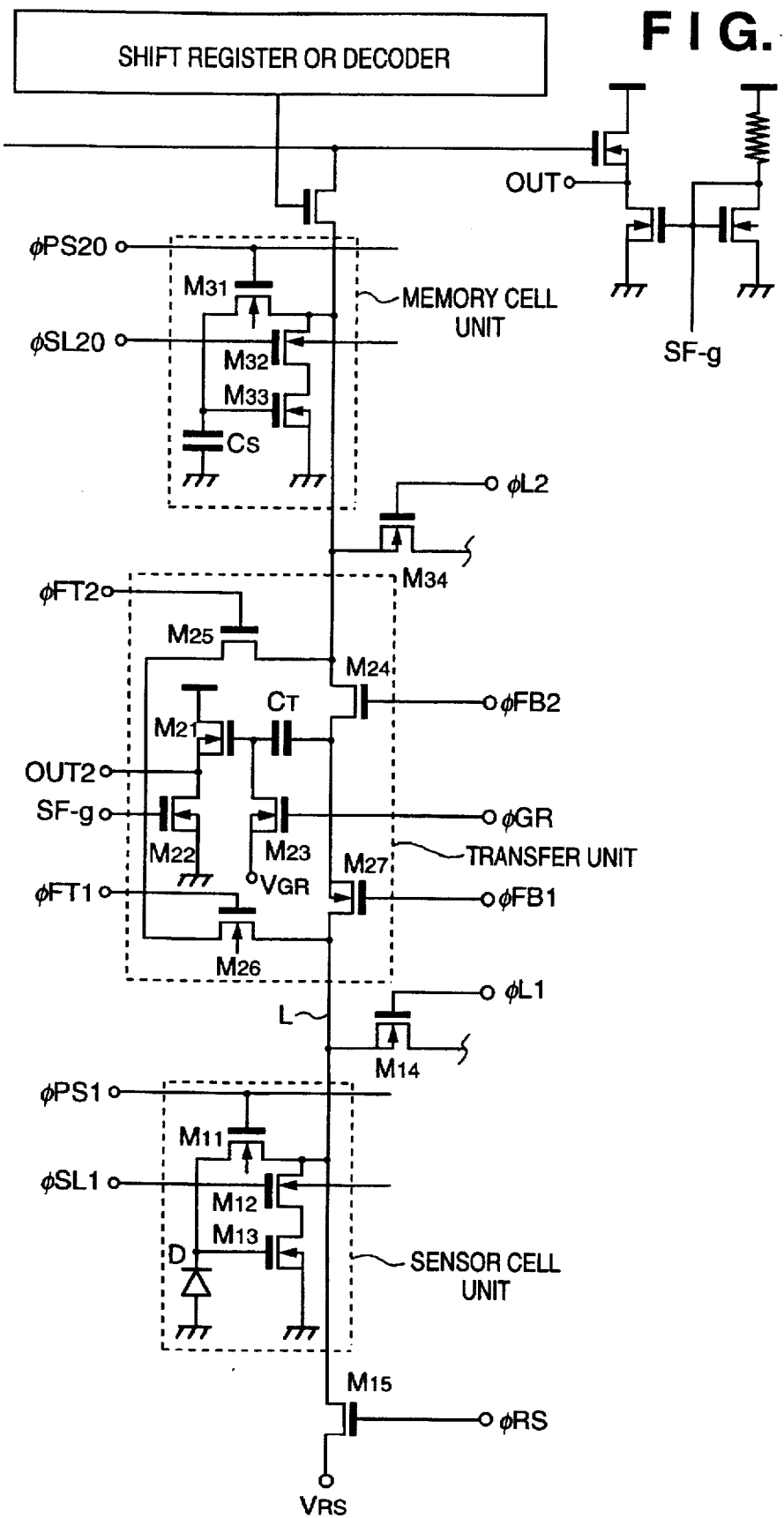
FIG. 8 is a circuit diagram of a solid-state image sensing device according to a fourth embodiment of the present invention.
Figure 9:
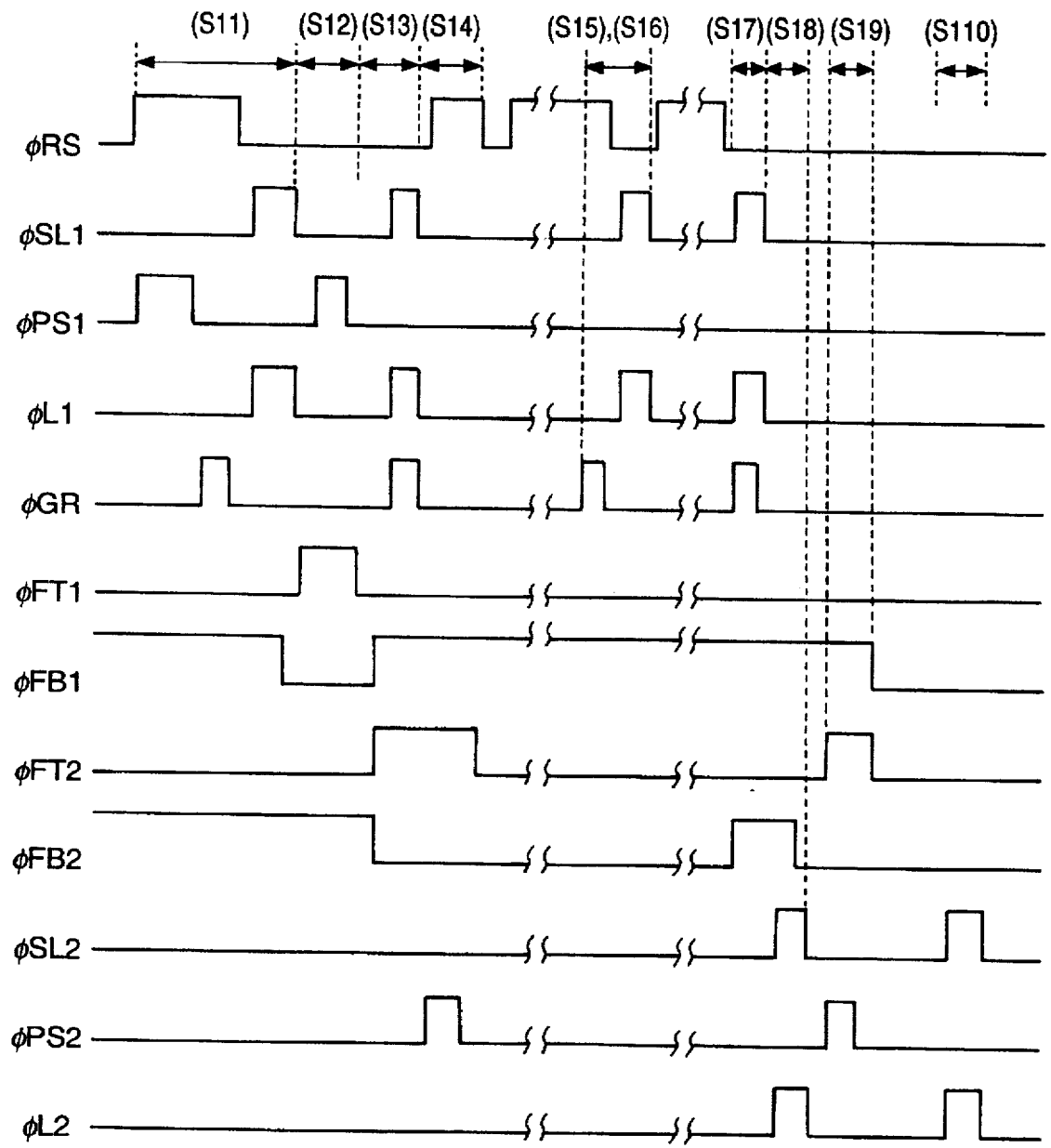
FIG. 9 is a timing chart of pulses showing an operation of the solid-state image sensing device according to the fourth embodiment.

FIG. 8 is an equivalent circuit diagram of a solid-state image sensing device according to the fourth embodiment, and FIG. 9 is a timing chart showing timing of operating the solid-state image sensing device. Note, FIG. 8 shows an example having a sensor cell unit, a transfer unit and a memory cell unit, however, a plurality of each of these units may be provided. Further, only one common output line is shown in FIG. 8 for the sake of simplicity.

As shown in FIG. 8, a circuit configuration of the fourth embodiment is that an n channel MOS transistor for controlling signal transmission to the sensor cell unit and an n channel MOS transistor $M_{27}$ for controlling signal transmission from the sensor cell unit to the capacitor $C_T$ are added to the transfer unit shown in FIG. 5. The configurations of the other parts of the transfer unit, the sensor cell unit and the memory cell unit are the same as those of the solid-state image sensing device shown in FIG. 5. Note, the n channel MOS transistors, $M_{24}$, $M_{25}$, $M_{26}$ and $M_{27}$ turn ON and OFF in response to control pulses $\phi FB2$, $\phi FT2$, $\phi FT1$ and $\phi FB1$, respectively.

Figure 10:
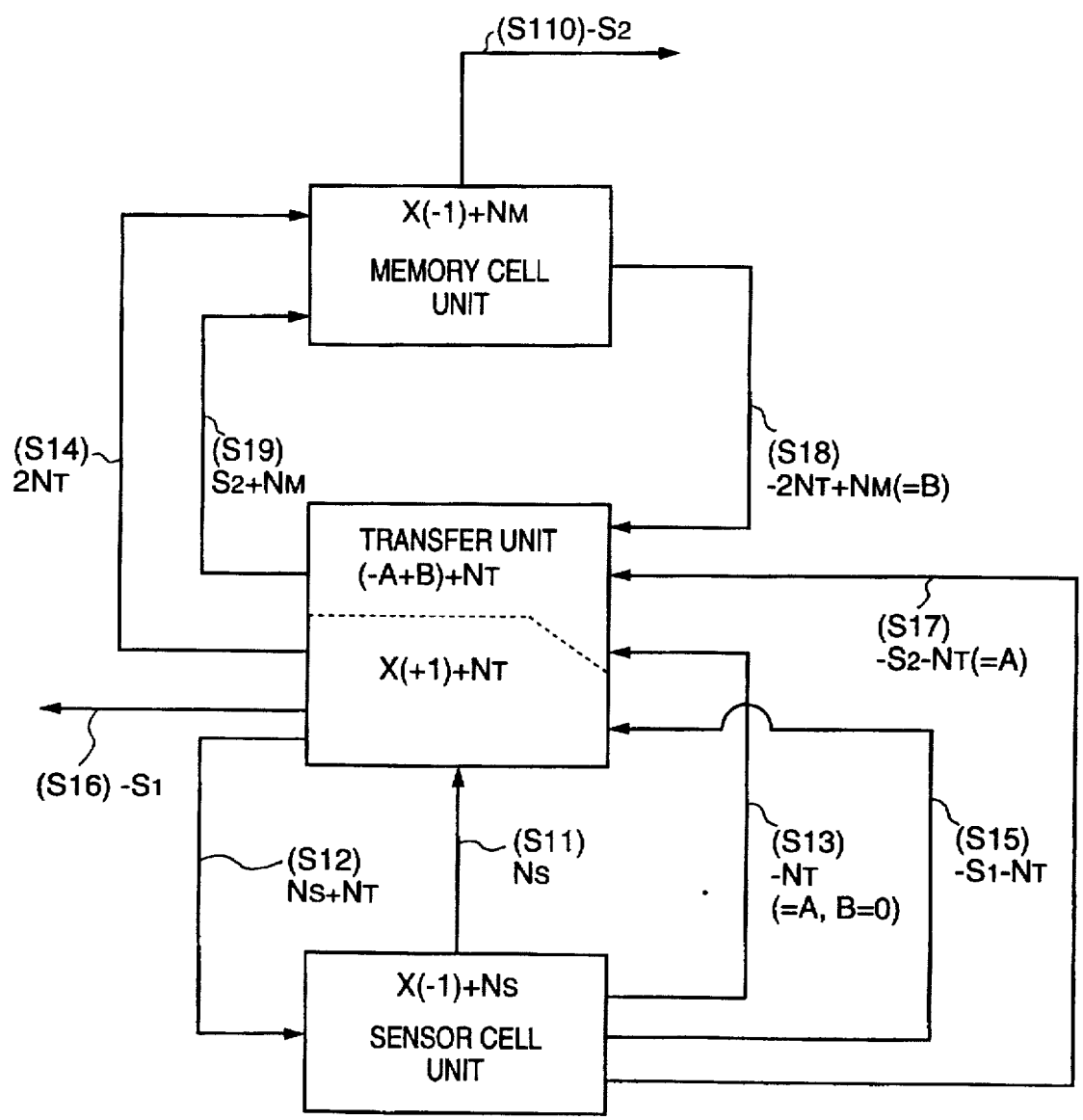
FIG. 10 is an explanatory view showing a flow of signals according to the fourth embodiment of the present invention.

In follow, a flow of a signal upon operating the aforesaid solid-state image sensing device will be briefly described with reference to FIG. 10. Note, periods referred by (S11) to (S110) in the timing chart of FIG. 9 correspond to the following operations referred by (S11) to (S110).

(S11) Noise $N_S$ of the sensor cell unit (sensor cell noise) is read out, and sent to the transfer unit.

(S12) The noise $N_T$ of the transfer unit (transfer noise) is added and the total noise $(N_S+N_T)$ is inputted to the sensor cell unit.

(S13) In the sensor cell unit, the sensor cell noise $N_S$ is added to an inverse of the input signal, $-(N_S+N_T)$, then the noise $-N_T$ is sent to the transfer unit.

(S14) In the transfer unit, the input signal $-N_T$ is inverted, and the transfer noise $N_T$ is added to it, them the sum of the noises, $2N_T$, is sent to the memory cell unit.

(S15) The sensor cell unit is then in the photo-electric charge storage period (the noise $N_S+N_T$ still remains in the sensor cell unit), and an inverted signal, $-S_1$, corresponding to the stored charge in the sensor cell unit (first sensor signal) is read out in the middle of the photo-electric charge storage period. The first sensor signal $-S_1$ and the inverse of the remaining noise $(N_S+N_T)$ and the sensor cell noise $N_S$ are added. Consequently, the signal $(-S_1-N_T)$ is sent to the transfer unit.

(S16) In the transfer unit, the noise $N_T$ is added to the input signal $(-S_1-N_T)$ and the resultant signal becomes $-S_1$, and this signal $-S_1$ is outputted as an image signal obtained during the photo-electric charge storage operation. This signal can be used for determining a charge storage period for a cell in an automatic focus sensor, for example.

(S17) In the sensor cell unit, photo-electric charge is further stored, and an inverted signal, $-S_2$, (second sensor signal) corresponding to the stored charge in the sensor cell unit is read out after the photo-electric charge storage period. The second sensor signal $-S_2$ and the inverse of the remaining noise $(N_S+N_T)$ and the sensor cell noise $N_S$ is added, and sent to the transfer unit. The output signal here is $(-S_2-N_T)$.

(S18) The noise $N_M$ of the memory cell unit (memory cell noise) is added to the inverse of the input signal $-2N_T$, then the total noise $(-2N_T+N_M)$ is transferred to the transfer unit.

(S19) In the transfer unit, the signal $(-S_2-N_T)$ is subtracted from the total noise $(-2N_T+N_M)$, and the transfer noise $N_T$ is added to the difference. Accordingly, the resultant signal $(S_2+N_M)$ is inputted to the memory cell unit.

(S110) The memory cell noise $N_M$ is added to the inverse of the input signal $(S_2+N_M)$, namely, $(-S_2-N_M)$. As a result, the second sensor signal $-S_2$ is outputted. This signal is an image signal.

Next, the above operations (S11) to (S110) are explained in more detail with reference to FIGS. 8 and 9.

First, the control pulses φRS and φPS1 become High to reset the sensor cell unit.

Next, after the control pulse φPS1 becomes Low, the control pulse φGR becomes High. At this time, φFB1 and φPB2 are kept High. Under this condition, the voltage at the terminal A of the capacitor $C_T$ is set to $V_{RS}$, and the voltage at the terminal B of the capacitor $C_T$ is set to $V_{GR}$.

Then, after the control pulses φGR and φRS become Low, the control pulses φSL1 and φL1 become High, thereby noise of the sensor cell after the reset operation is outputted from the sensor cell unit to the common output line L (The sensor cell noise is read out as $N_S$ in this case). The above operation corresponds to (S11).

Since the voltage of the common output line L changes by $N_S$, the voltage at the terminal B of the capacitor $C_T$ also changes by $N_S$ when it is floated. Thereafter, the control pulses φFB1, φSL1 and φL1 become Low, the control pulse φFT1 becomes High, then the control pulse φPS1 becomes High, and the sensor cell noise $N_S$ is transferred from the transfer unit to the sensor cell unit. Upon transferring the sensor cell noise $N_S$, the transfer noise $N_T$ is added to it, thus the total noise $(N_S+N_T)$ is inputted to the sensor cell unit as a result. The above operation corresponds to (S12).

Next, the control pulses φFB1 and φFT2 become High, then the control pulses φGR, φSL1 and φL1 become High, the inverse of the total noise signal $(N_S+N_T)$, namely—$(N_S+N_T)$, is outputted from the sensor cell to the transfer unit. Upon outputting the total noise, the sensor cell noise $N_S$ of the sensor cell is added, thus the noise $-N_T$ is actually inputted to the transfer unit. Under this condition, the voltage at the terminal A of the capacitor $C_T$ in the transfer unit changes by $-N_T$ while the voltage at the terminal B of the capacitor $C_T$ is fixed to $V_{GR}$. Further, the control pulse φGR becomes Low to make the terminal B of the capacitor $C_T$ is floated. The above operation corresponds to (S13).

Next, the control pulse φGR becomes low to make the terminal B of the capacitor $C_T$ floating and the control pulses φRS and φPS2 become High, the voltage at the terminal A of the capacitor $C_T$ becomes $V_{RS}$, namely the voltage changes by $N_T$. Accordingly, the terminal B of the capacitor $C_T$ also changes by $N_T$, thereby the signal $N_T$ is transmitted to the memory cell unit. However, since the transfer noise $N_T$ is added to it, the total noise is actually inputted to the memory cell unit. This operation corresponds to (S14).

Thereafter, the sensor cell unit starts storing photo-electric charge, and a signal corresponding to photo-electric charge stored in the sensor cell unit is outputted in the following manner during photo-electric charge storage operation.

First, the control pulse φGR becomes High (at this time, the control pulse φRS is kept High), the voltage at the terminal A of the capacitor $C_T$ becomes $V_{RS}$ and the voltage at the terminal B of the capacitor $C_T$ becomes $V_{GR}$. Thereafter, the control pulse φGR becomes Low to make the terminal B of the capacitor $C_T$ floating. Then, when the control pulses φSL1 and φL1 become High, a signal $(-S_1-N_T)$, which is a first sensor signal $-S_1$ plus the inverted remaining noise $(N_S+N_T)$ plus the sensor cell noise $N_S$, is sent from the sensor cell unit to the transfer unit. This operation corresponds to (S15).

Since the voltage at the terminal A of the capacitor $C_T$ of the transfer unit changes by $(-S_1-N_T)$, the voltage at the terminal B of the capacitor $C_T$ also changes by the same amount and becomes $V_{GR}+(-S_1-N_T)$. When this signal is transferred from the transfer unit, the transfer noise $N_T$ is added to it, thereby the first sensor signal $-S_1$ is outputted from an OUT2 terminal of the transfer unit. This operation corresponds to (S16).

Next, the sensor cell unit further stores photo-electric charge. When the control pulses φSL1, φL1, φGR and φFB2 become High after completing the photo-electric charge storage operation, the voltage at the terminal B of the capacitor $C_T$ is fixed at $V_{GR}$, and the voltage at the terminal A of the capacitor $C_T$ changes by $(-S_2-N_T)$ from $V_{RS}$. Note, the signal $(-S_2-N_T)$ is that a second sensor signal $-S_2$ plus the inverted remaining noise $(N_S+N_T)$ plus the sensor cell noise $N_S$. This corresponds to (S17).

When the control pulses φSL2 and φL2 become High, a signal $(-2N_T+N_M)$, which is an inverted noise $-2N_T$ plus the memory cell noise $N_M$, is sent to the terminal A of the capacitor $C_T$ of the transfer unit (at this time, the terminal B of the capacitor $C_T$ of the transfer unit is floating). This operation corresponds to (S18).

Accordingly, the voltage at the terminal A of the capacitor $C_T$ becomes $-(-S_2-N_T)+(-2N_T+N_M)=S_2-N_T+N_M$. As a result, the voltage at the terminal B of the capacitor $C_T$ also changes by $(S_2-N_T+N_M)$. When the control pulses φFT2 and φPS2 become High, this signal $(S_2-N_T+N_M)$ is transferred from the transfer unit to the memory cell unit. At this time, the transfer noise $N_T$ is added to it, thereby a signal $(S_2+N_M)$ is actually inputted to the memory cell unit. This operation corresponds to (S19).

Thereafter, the control pulses φSL2 and φL2 become High, then a signal is read out from the memory cell unit. Upon reading the signal, the memory cell noise $N_M$ is added to the inverted input signal $(-S_2-N_M)$. Consequently, the second sensor signal $-S_2$ without noise components is outputted. This is the operation (S110).

According to the fourth embodiment as described above, a random noise which is added in the reset operation is removed in operation (S19), thereby it is possible to output a signal $-S_2$ in high S/N ratio having no sensor random noise.

According to the fourth embodiment as described above, it is possible to remove noise components generated in the sensor cell unit, the memory cell unit and the transfer unit, thereby outputting a signal $-S_2$ in high S/N ratio.

Further, according to the third and fourth embodiment, a solid-state image sensing device can be configured with transistors, thereby it is possible to provide an inexpensive solid-state image sensing device manufactured by using a simple manufacturing process.

As many apparently widely different embodiments of the present invention can be made without departing from the spirit and scope thereof, it is to be understood that the invention is not limited to the specific embodiments thereof except as defined in the appended claims.

What is claimed is:

1. A solid-state image sensing device comprising:

photo-electric conversion means for converting incoming light into electric signals;

power supply means for supplying a reference level to a sense line; and inverting-amplification means for outputting a voltage as a first signal corresponding to the electric signals outputted from said photo-electric conversion means through the sense line.

2. The solid-state image sensing device according to claim 1, wherein a voltage outputted from said inverting-amplification means is set to the voltage of the sense line before outputting the fist signal.

3. The solid-state image sensing device according to claim 2, wherein a change from the voltage of said inverting-amplification means which is set to the voltage of the sense line to the voltage corresponding to the electric signals outputted from said photo-electric conversion means is negative.

4. The solid-state image sensing device according to claim 2, further comprising:

first storage means for storing a second signal outputted from said inverting-amplification means when the voltage is set to the voltage of the sense line;

second storage means for storing the first signal outputted from said inverting-amplification means; and differential means for outputting a difference between the second signal stored in said first storage means and the first signal stored in said second storage means.

5. The solid-state image sensing device according to claim 1, further comprising switching means for selecting the solid-state image sensing device from which a signal is to be outputted.

6. The solid-state image sensing device according to claim 1, wherein said inverting-amplification means includes a first MOS transistor which is connected between said power supply means and the sense line and a second MOS transistor whose first terminal is grounded and second terminal connects to the sense line, and outputs the first signal from the second terminal.

7. The solid-state image sensing device according to claim 6, further comprising ground means for grounding the sense line in accordance with a control signal, wherein the second MOS transistor is an enhancement type MOS transistor.

8. A solid-state image sensing device comprising:

photo-electric conversion means for converting incoming light into electric signals;

power supply means for supplying electrical power through a sense line;

inverting-amplification means for inverse-amplifying an input signal, adding a first noise which is specific to said inverting-amplification means, and outputting the added signal through the sense line;

memory means for inverting polarity of an input signal, adding a second noise which is specific to said memory means, and outputting the added signal through the sense line; and operation means for operating an input signals from said inverting-amplification means and said memory means, adding a third noise which is specific to said operation means, and outputting the added signal through the sense line.

9. The solid-state image sensing device according to claim 8, wherein said inverting-amplification means outputs a signal after inverting and amplifying an electric signal outputted from said photo-electric conversion means.

10. The solid-state image sensing device according to claim 8, wherein said memory means inverts a signal outputted from said operation means, adds the second noise, then outputs the added signal as an image signal from which the first to third noises are removed.

11. The solid-state image sensing device according to claim 8, wherein said operation means includes a capacitor, and it operates an input signal by changing voltages at both terminals of the capacitor.

12. The solid-state image sensing device according to claim 11, further comprising a switching means, connected between the capacitor and said inverting amplification means, for controlling one terminal of the capacitor to be in a floating state or to have a fixed voltage.

13. The solid-state image sensing device according to claim 8, wherein said inverting-amplification means, said memory means and said operation means are configured by using MOS transistors.

14. The solid-state image sensing device according to claim 8, wherein said operation means comprises:

first transfer means for inverting polarity of an input signal from said inverting-amplification means and outputting it after adding the third noise; and second transfer means for inverting an input signal from said inverting-amplification means, adding the inverted signal to a signal inputted from said memory means, and outputting the added signal after adding the third noise.

15. The solid-state image sensing device according to claim 8, wherein said operation means comprises:

first transfer means for outputting a signal inputted from said inverting-amplification means after adding the third noise;

second transfer means for inverting polarity of a signal input from said inverting-amplification means and outputting a signal obtained by adding the third noise to the input signal; and third transfer means for inverting an input signal from said inverting-amplification means, adding the inverted signal to a signal inputted from said memory means, and outputting the added signal after adding the third noise.

16. The solid-state image sensing device according to claim 15, wherein said first transfer means outputs the added signal as an image signal from which the first to third noises are removed, and said memory means inverts a signal inputted from said third transfer means, adds the second noise to the input signal, and outputs the added signal as an image signal from which the first to third noises are removed.

17. The solid-state image sensing device according to claim 16, wherein the image signal outputted from said first transfer means corresponds to a photo-electric signal obtained in the middle of storage operation by said photo-electric conversion means, and the image signal outputted from said memory means corresponds to a photo-electric signal obtained after completing the storage operation by said photo-electric conversion means.

18. A method controlling a solid-state image sensing device having a sensor cell unit, a transfer unit, a memory cell unit and outputting an image signal after removing a first, second and third noises which are specific to respective units, said method comprising:

a first output step of outputting the first noise of the sensor cell unit to the transfer unit;

a second output step of inverting the first noise outputted at said first output step and outputting a signal to the memory cell unit after adding the second noise to the inverted first noise;

a photo-electric conversion step of photo-electric converting incoming light into electric charge;

a third output step of inverting and amplifying the electric charge obtained at said photo-electric conversion step, adding the first noise, and outputting the resultant signal to the transfer unit;

a fourth output step of inverting the signal outputted at said second output step, adding the third noise to the inverted signal, and outputting the resultant signal to the transfer unit;

a fifth output step of inverting the signal outputted at said third output step, adding the signal outputted at said fourth output step to the signal outputted at said third output step and the second noise to the inverted signal, and outputting the resultant signal to the memory cell unit; and a sixth output step of inverting the signal outputted at said fifth output step, adding the third noise, and outputting the resultant signal.

19. A method controlling a solid-state image sensing device having a sensor cell unit, a transfer unit, a memory cell unit and outputting an image signal after removing a first, second and third noises specific to respective units, said method comprising:

a first output step of outputting the first noise of the sensor cell to the transfer unit;

a second output step of adding the second noise to the first noise outputted at said first output step and outputting the resultant signal to the sensor cell unit;

a third output step of storing the signal outputted at said second step, inverting the signal, adding the first noise to the inverted signal, and outputting the resultant signal to the transfer unit;

a fourth output step of inverting the signal outputted at said third output step, adding the second noise to the inverted signal, and outputting the resultant signal to the memory cell unit;

a first photo-electric conversion step of photo-electric converting incoming light into electric charge in the sensor cell unit;

a fifth output step of inverting and amplifying the electric charge obtained at said first photo-electric conversion step in the sensor cell unit, adding the stored signal outputted at said second output step and the first noise to the inverted and amplified signal, and outputting the resultant signal to the transfer unit;

a sixth output step of adding the second noise to the signal outputted at said fifth output step, and outputting the resultant signal as an image signal;

a second photo-electric conversion step of photo-electric converting incoming light into electric charge in the sensor cell unit;

a seventh output step of inverting and amplifying the charge obtained at said second photo-electric conversion step in the sensor cell unit, adding the stored signal outputted at said second output step and the first noise to the inverted and amplified signal, and outputting the resultant signal to the transfer unit;

an eighth output step of inverting the signal outputted at said fourth output step, adding the third noise to the inverted signal, and outputting the resultant signal to the transfer unit;

a ninth output step of inverting the signal outputted at said seventh output step, adding the signal outputted at said eighth output step and the second noise to the inverted signal, and outputting the resultant signal to the memory cell unit; and a tenth output step of inverting the signal outputted at said ninth output step, adding the third noise to the inverted signal, and outputting the resultant signal as an image signal.

20. The method of controlling a solid-state image sensing device according to claim 19, wherein the signal outputted at said sixth output step is an image signal corresponding to the electric charge obtained in the middle of photo-electric charge storage operation by photo-electric conversion means and the signal outputted at said tenth output step is an image signal corresponding to the electric charge obtained after completing the photo-electric charge storage operation by the photo-electric conversion means.

* * * * *

UNITED STATES PATENT AND TRADEMARK OFFICE
CERTIFICATE OF CORRECTION

PATENT NO. : 5,698,844
DATED : December 16, 1997
INVENTOR(S) : MAHITO SHINOHARA, ET AL.

It is certified that error appears in the above-identified patent and that said Letters Patent is hereby corrected as shown below:

COLUMN 1

Line 24, "a" should read --the--; and
    Line 48, "a" should be deleted.

COLUMN 4

Line 48, "referred" should read --referred to--; and
    Line 63, "sets" should read --of sets--.

COLUMN 5

Line 8, "equals" should read --is equal--.

COLUMN 6

Line 10, "comparing to" should read --as compared with--.

COLUMN 7

Line 36, "comparing to" should read --as compared with--; and
    Line 37, "drop of" should read --a drop in--.

COLUMN 8

Line 7, "remained" should read --remaining--;
    Line 32, "operation" should be deleted;
    Line 51, "referred" should read --referred to--; and
    Line 53, "referred" should read --referred to--.

UNITED STATES PATENT AND TRADEMARK OFFICE
CERTIFICATE OF CORRECTION

PATENT NO. : 5,698,844

DATED : December 16, 1997

INVENTOR(S) : MAHITO SHINOHARA, ET AL.

It is certified that error appears in the above-identified patent and that said Letters Patent is hereby corrected as shown below:

COLUMN 10

Line 26, "sotrage" should read --storage--;
    Line 38, "transistor" should read --transistor $M_{26}$--;
    Line 49, "follow" should read --the following--; and
    Line 63, "them" should read --then--.

COLUMN 12

Line 10, "noise" should read --noise $2N_T$--.

COLUMN 13

Line 32, "fist" should read --first--.

COLUMN 15

Line 45, "a" should be deleted.

Signed and Sealed this

Fourth Day of August, 1998

Attest:

BRUCE LEHMAN

*Attesting Officer*     *Commissioner of Patents and Trademarks*